United States Patent
Cho et al.

(10) Patent No.: US 9,479,936 B2
(45) Date of Patent: Oct. 25, 2016

(54) ELECTRONIC DEVICE AND CONTENT SHARING METHOD

(71) Applicant: SAMSUNG ELECTRONICS CO., LTD., Suwon-si (KR)

(72) Inventors: Chi-Hyun Cho, Seoul (KR); Youn-gun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/966,757

(22) Filed: Aug. 14, 2013

(65) Prior Publication Data

US 2014/0059707 A1    Feb. 27, 2014

(30) Foreign Application Priority Data

Aug. 24, 2012 (KR) .......................... 10-2012-0093251

(51) Int. Cl.
*H04L 29/00* (2006.01)
*H04W 12/08* (2009.01)
*H04N 21/24* (2011.01)
(Continued)

(52) U.S. Cl.
CPC ......... *H04W 12/08* (2013.01); *H04M 1/72563* (2013.01); *H04N 21/24* (2013.01); *H04N 21/4126* (2013.01); *H04N 21/41407* (2013.01); *H04N 21/43637* (2013.01); *H04N 21/4667* (2013.01); *H04N 21/4788* (2013.01); *H04N 21/633* (2013.01); *H04M 1/7253* (2013.01);
(Continued)

(58) Field of Classification Search
CPC ........... H04W 12/08; H04M 2250/64; H04M 1/7253; H04M 1/72563; H04M 2250/06; H04N 21/24; H04N 21/4126; H04N 21/41407; H04N 21/43637; H04N 21/4667; H04N 21/4788; H04N 21/633
USPC .......................................................... 726/29
See application file for complete search history.

(56) References Cited

U.S. PATENT DOCUMENTS 8,990,273 B2 * 3/2015 Iarocci .................... H04L 67/16
455/403
9,160,786 B1 * 10/2015 Jackson .................. H04L 67/06
(Continued)

FOREIGN PATENT DOCUMENTS

EP    1953989 A1    8/2008
KR    10-2011-0072105 A    6/2011
(Continued)

OTHER PUBLICATIONS

International Search Report (PCT/ISA/220), dated Nov. 15, 2013, issued by the International Searching Authority in counterpart International Patent Application No. PCT/KR2013/007199.
(Continued)

*Primary Examiner* — Michael Pyzocha
(74) *Attorney, Agent, or Firm* — Sughrue Mion, PLLC

(57) ABSTRACT

A method of sharing content for an electronic device is provided. The electronic device is capable of changing contents that are to be shared when a network changes. The content sharing method includes storing a list of contents shared between the electronic device and another electronic device via a network formed using an access point, such that the contents match the access point, and setting contents included in a list of contents stored to match the access point as contents to be shared in response to the electronic device being connected to the network via the access point.

21 Claims, 5 Drawing Sheets

(51) Int. Cl.

| | |
|---|---|
| *H04N 21/41* | (2011.01) |
| *H04N 21/414* | (2011.01) |
| *H04N 21/4363* | (2011.01) |
| *H04N 21/466* | (2011.01) |
| *H04N 21/4788* | (2011.01) |
| *H04N 21/633* | (2011.01) |
| *H04M 1/725* | (2006.01) |

(52) U.S. Cl.
CPC ..... *H04M 2250/06* (2013.01); *H04M 2250/64* (2013.01)

(56) References Cited

U.S. PATENT DOCUMENTS

| | | | |
|---|---|---|---|
| 2003/0023725 A1* | 1/2003 | Bradfield | G06F 21/6218 709/225 |
| 2003/0221122 A1* | 11/2003 | Hatori | 713/200 |
| 2004/0186902 A1* | 9/2004 | Stewart | 709/217 |
| 2005/0059416 A1* | 3/2005 | Ono | 455/457 |
| 2005/0119012 A1* | 6/2005 | Merheb | H04W 4/02 455/456.3 |
| 2005/0136941 A1* | 6/2005 | Asho | H04W 4/02 455/456.1 |
| 2006/0143133 A1* | 6/2006 | Medvinsky | 705/59 |
| 2006/0253874 A1 | 11/2006 | Stark et al. | |
| 2007/0061398 A1* | 3/2007 | Forssell | 709/204 |
| 2007/0079013 A1* | 4/2007 | Tumsi Dayakar | H04W 4/02 709/250 |
| 2007/0087682 A1* | 4/2007 | DaCosta | 455/3.01 |
| 2007/0156659 A1* | 7/2007 | Lim | 707/3 |
| 2007/0178914 A1* | 8/2007 | Montenegro | 455/456.5 |
| 2007/0180382 A1 | 8/2007 | Kortum et al. | |
| 2007/0280186 A1* | 12/2007 | Kaneko | 370/338 |
| 2007/0294755 A1* | 12/2007 | Dadhia et al. | 726/11 |
| 2007/0299737 A1* | 12/2007 | Plastina | G06Q 30/0207 705/14.1 |
| 2008/0059216 A1* | 3/2008 | Fromentoux et al. | 705/1 |
| 2008/0062940 A1* | 3/2008 | Othmer et al. | 370/338 |
| 2008/0066112 A1* | 3/2008 | Bailey et al. | 725/58 |
| 2008/0109679 A1* | 5/2008 | Wright | H04L 63/102 714/37 |
| 2008/0147798 A1* | 6/2008 | Paalasmaa et al. | 709/204 |
| 2008/0226260 A1 | 9/2008 | Yang et al. | |
| 2008/0240016 A1 | 10/2008 | Cai et al. | |
| 2009/0064299 A1* | 3/2009 | Begorre | H04W 12/06 726/7 |
| 2009/0100135 A1 | 4/2009 | Lee et al. | |
| 2009/0196302 A1* | 8/2009 | Pastorino et al. | 370/401 |
| 2009/0265426 A1* | 10/2009 | Svendsen et al. | 709/204 |
| 2010/0066839 A1* | 3/2010 | Azuma et al. | 348/207.1 |
| 2010/0154049 A1* | 6/2010 | Yoshimi et al. | 726/13 |
| 2011/0014929 A1* | 1/2011 | Moshfeghi et al. | 455/456.3 |
| 2011/0029610 A1* | 2/2011 | Chao | G06F 17/30209 709/204 |
| 2011/0032857 A1* | 2/2011 | Umeuchi | H04W 48/20 370/311 |
| 2011/0173337 A1* | 7/2011 | Walsh | H04W 4/023 709/229 |
| 2011/0209201 A1* | 8/2011 | Chollat | 726/4 |
| 2011/0246611 A1* | 10/2011 | Jabara et al. | 709/217 |
| 2011/0289193 A1* | 11/2011 | Kim et al. | 709/219 |
| 2012/0011559 A1* | 1/2012 | Miettinen | G06F 21/31 726/1 |
| 2012/0023430 A1* | 1/2012 | Amidon et al. | 715/772 |
| 2012/0052829 A1* | 3/2012 | Lee | H04W 48/18 455/226.2 |
| 2012/0124612 A1* | 5/2012 | Adimatyam et al. | 725/27 |
| 2012/0127925 A1* | 5/2012 | Kim | H04L 63/104 370/328 |
| 2012/0167175 A1* | 6/2012 | Choi | 726/3 |
| 2012/0176946 A1* | 7/2012 | Hunt | H04W 52/0258 370/311 |
| 2012/0185910 A1* | 7/2012 | Miettinen | G06F 21/31 726/1 |
| 2012/0197765 A1* | 8/2012 | Kim et al. | 705/27.1 |
| 2012/0215882 A1* | 8/2012 | Goto | H04L 12/2812 709/217 |
| 2012/0246247 A1* | 9/2012 | Lim et al. | 709/206 |
| 2012/0254746 A1* | 10/2012 | Avadhanam | 715/702 |
| 2012/0271910 A1 | 10/2012 | Huh | |
| 2012/0303705 A1* | 11/2012 | Park et al. | 709/204 |
| 2013/0050259 A1* | 2/2013 | Ahn | G06F 3/1454 345/633 |
| 2013/0054697 A1* | 2/2013 | Cha | 709/204 |
| 2013/0132477 A1* | 5/2013 | Bosworth et al. | 709/204 |
| 2013/0132543 A1* | 5/2013 | Langer | G06F 17/30855 709/223 |
| 2013/0138693 A1* | 5/2013 | Sathish | G06F 17/30029 707/784 |
| 2013/0143600 A1* | 6/2013 | Jan et al. | 455/456.3 |
| 2013/0151148 A1* | 6/2013 | Parundekar | G01C 21/3679 701/521 |
| 2013/0174223 A1* | 7/2013 | Dykeman et al. | 726/4 |
| 2013/0226914 A1* | 8/2013 | Kurabayashi et al. | 707/723 |
| 2013/0281122 A1* | 10/2013 | Zelinka | 455/456.3 |
| 2014/0053078 A1* | 2/2014 | Kannan | 715/748 |

FOREIGN PATENT DOCUMENTS

| | | |
|---|---|---|
| WO | 2011/098863 A1 | 8/2011 |
| WO | 2012/020905 A1 | 2/2012 |

OTHER PUBLICATIONS

Communication dated Dec. 20, 2013, issued by the European Patent Office in corresponding Application No. 13179772.2.

* cited by examiner

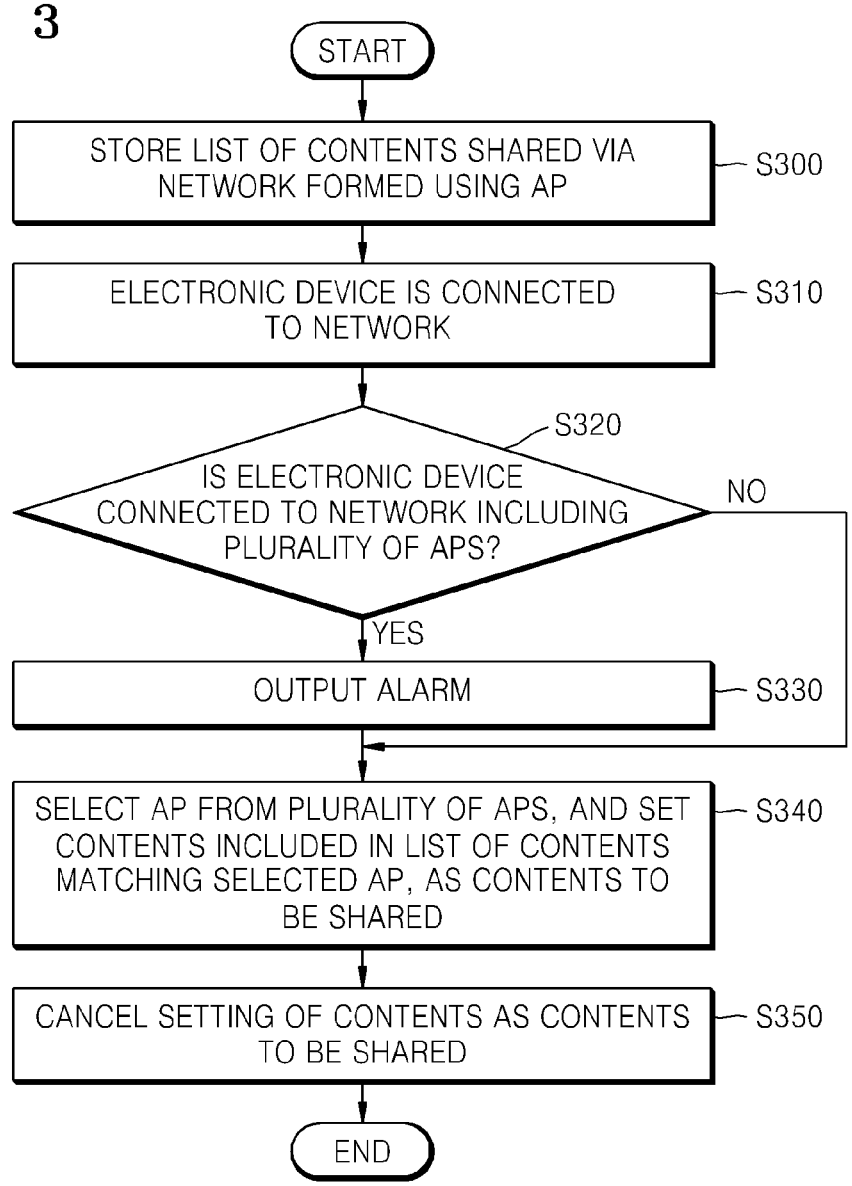

FIG. 5

| AP | ANOTHER DEVICE | CONTENTS TO BE SHARED |
|---|---|---|
| AP 1 | TV 1 | FIRST PHOTO, SECOND PHOTO |
| | PC 1 | FIRST MOVING PICTURE, FIRST DOCUMENT |

LIST OF CONTENTS TO BE SHARED (110)

ELECTRONIC DEVICE AND CONTENT SHARING METHOD

CROSS-REFERENCE TO RELATED PATENT APPLICATION

This application claims the benefit of Korean Patent Application No. 10-2012-0093251, filed on Aug. 24, 2012, in the Korean Intellectual Property Office, the disclosure of which is incorporated herein in its entirety by reference, in its entirety.

BACKGROUND

1. Field

The exemplary embodiments of the present invention relates to an electronic device and a method of sharing contents for an electronic device. More particularly, the exemplary embodiments relate an electronic device capable of sharing contents and to a method of setting contents to be shared so as to share content between an electronic device, and another device.

2. Description of the Related Art

It is known, to share, in the related art, contents that may be set in an electronic device and the set contents may be shared with another electronic device.

However, this technology enables the same contents to be shared even when a network connected to an electronic device changes, and is thus vulnerable with respect to the security of the contents.

In order to change contents to be shared, a user should change the settings of the contents to be shared and would feel inconvenienced as a result of changing the settings for the contents.

SUMMARY

The exemplary embodiments provide an electronic device and method of changing contents to be shared when a network changes, thereby increasing the level of security for the contents.

The exemplary embodiment also provides a method of removing the user inconvenience caused when a network connected to an electronic device changes, and a user should thus change the settings of contents to be shared, and an electronic device thereof.

According to an aspect of the exemplary embodiments a content sharing method is provided which includes storing a list of contents shared between an electronic device and another device via a network which is formed using an access point, such that the contents match the access point, and setting as contents to be shared contents included in the list of contents stored to match the access point when the electronic device is connected to the network via the access point.

The setting of the contents included in the list of contents stored to match the access point, as the contents to be shared, may include setting a content that shares at least one piece of meta data with the contents included in the list of contents stored to match the access point, as a content to be shared.

The method may further include checking a received signal strength indication (RSSI) of the access point, and canceling the setting of the contents as the contents to be shared, when the RSSI is less than or equal to a predetermined value.

The method may further include determining whether the electronic device is connected to the network which includes a plurality of access points, and outputting an alarm which indicates the connection to the network which includes the plurality of access points.

The outputting of the alarm may include displaying a list of the plurality of access points to which the electronic device is connected.

The setting of the contents included in the list of contents stored to match the access point as the contents to be shared may include setting the contents as the contents to be shared, based on times when the contents are shared using the access point and the current time.

The storing of the list of contents shared with the other device such that the contents match the access point may include storing the contents to match the other device that shares the contents with the electronic device. The setting of the contents included in the list of contents as the contents to be shared which are stored to match the access point may include setting the matched contents as the contents to be shared, in response to a device connected to the network formed using the access point being connected to the electronic device and the other device that shares the contents with the electronic device being the same.

The setting of the contents included in the list of contents as the contents to be shared which are stored to match the access point may include setting the contents to be shared in units of types of content.

The storing of the list of contents shared between the electronic device and the other device using the access point may include storing in a separate server the list of contents shared with the other device. The setting of the contents included in the stored list of contents as the contents to be shared may include receiving the list of contents stored to match the access point from the server when the electronic device is connected to the access point, and setting the contents included in the received list of contents as the contents to be shared.

The contents shared between the electronic device and the other device via the access point may include a content transmitted from the electronic device to a cloud server via the access point.

According to another aspect of the exemplary embodiments, there is provided a non-transitory computer readable storage medium having recorded thereon a program for performing the above-described method.

According to another aspect of the exemplary embodiment, an electronic device is provided which is configured to share contents with another device, the electronic device including a list-of-shared contents storage configured to store a list of contents shared between the electronic device and the other device via a network formed using an access point, such that the contents match the access point, and a contents-to-be shared setting module configured to set contents included in the list of contents stored to match the access point, as contents to be shared, in response to the electronic device being connected to the network via the access point.

The contents-to-be shared setting module may not only set the contents included in the list of contents stored to match the access point, but may also set a content that shares at least one piece of meta data with the contents included in the list of contents, as the contents to be shared.

The contents-to-be shared setting module may be configured to check a received signal strength indication (RSSI) of the access point, and may cancel the setting of the contents as the contents to be shared when the RSSI is less than or equal to a predetermined value.

The electronic device may further include an alarm generator configured to output an alarm which indicates that the electronic device is connected to a network including a plurality of access points, in response to a determination that the electronic device is connected to the network including the plurality of access points.

The alarm generator may be configured to output to a screen of the electronic device a list of the plurality of access points to which the electronic device is connected.

The contents-to-be shared setting module may set the contents to be shared, based on times when the contents are shared using the access point and the current time.

The list-of-shared contents storage may store the contents to match the other device that shares the contents with the electronic device. The contents-to-be shared setting module may set the contents matching the access point as the contents to be shared in response to a device connected to the network formed using the access point to which the electronic device is connected and the other device that shares the contents being the same.

The contents-to-be shared setting module may set the contents to be shared in units of types of content.

The list-of-shared contents storage may store in a server the list of contents shared with the other device via the access point. The contents-to-be shared setting module may receive the list of stored contents to match the access point from the server, in response to the electronic device being connected to the access point, and may set as the contents to be shared the contents included in the received list of contents.

An aspect of the exemplary embodiments may further provide an electronic device capable of sharing contents with another electronic device, the electronic device including: a storage configured to store a list of contents shared between the electronic device and the other device via a network, where the contents match an access point; and a setting module configured to set contents included in the stored list of contents as contents to be shared.

The network may be formed using an access point.

The setting module may set the contents in order to match the access point in response to the electronic device being connected to the network via the access point.

The setting module may not only set the contents included in the list of contents stored to match the access point but also sets a content that shares at least one piece of meta data with the contents included in the list of contents, as the contents to be shared.

The setting module checks a received signal strength indication (RSSI) of the access point, and cancels the setting of the contents as the contents to be shared in response to the RSSI being less than or equal to a predetermined value.

The electronic device may further include an alarm generator configured to output an alarm which indicates that the electronic device is connected to a network including a plurality of access points in response to a determination that the electronic device is connected to the network including the plurality of access points. The alarm generator may output to a screen of the electronic device a list of the plurality of access points to which the electronic device is connected.

In addition, the setting module may set the contents to be shared, based on times when the contents are shared using the access point and the current time.

The contents shared between the electronic device and the other device may include a content transmitted from the electronic device to a cloud server via the access point.

BRIEF DESCRIPTION OF THE DRAWINGS

The above and other features and advantages of the exemplary embodiments will become more apparent by describing in detail exemplary embodiments thereof with reference to the attached drawings in which:

FIG. 3 is a flowchart which illustrates a process of setting contents to be shared according to another exemplary embodiment;

FIG. 4 is a table which illustrates a method of storing a list of contents shared between an electronic device and another device according to an exemplary embodiment;

FIG. 5 is a table which illustrates a method of storing a list of contents shared between an electronic device and another device according to another exemplary embodiment;

DETAILED DESCRIPTION OF THE EXEMPLARY EMBODIMENTS

Figure 1:
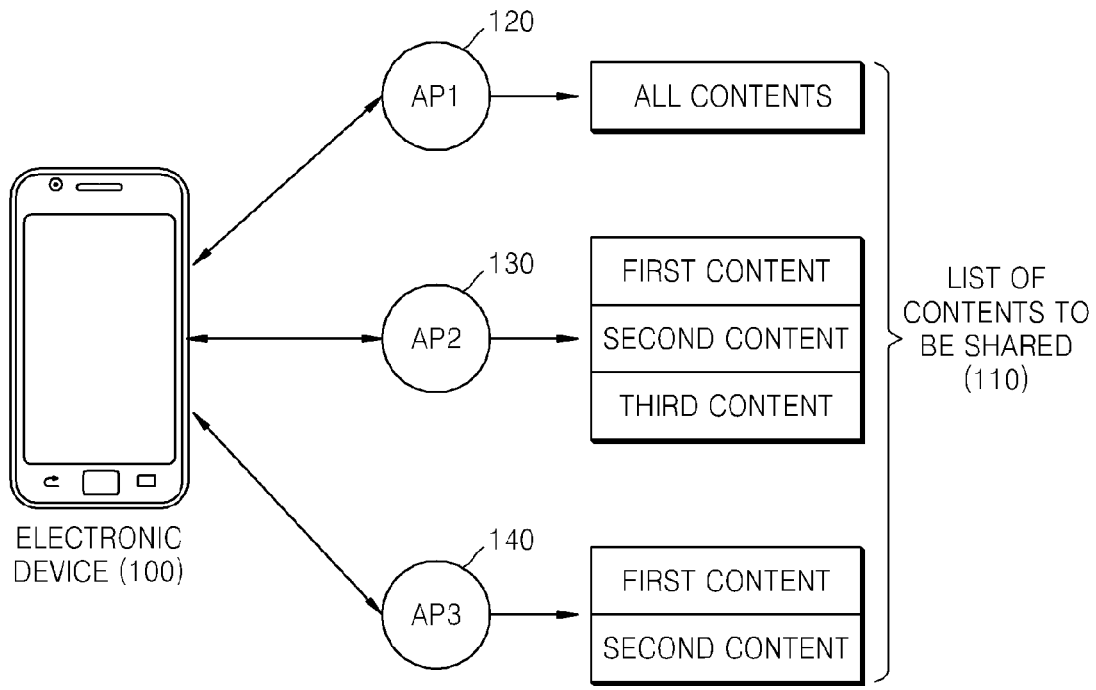
FIG. 1 is a diagram which illustrates a list of content to be shared, which is set by an electronic device, according to an exemplary embodiment.

Hereinafter, exemplary embodiments will be described in greater detail with reference to the accompanying drawings so that those of ordinary skill in the technical field to which the exemplary embodiments pertain may easily be accomplished. The exemplary embodiments may, however, be embodied in many different forms and should not be construed as being limited to the exemplary embodiments set forth herein. In the drawings, parts that are not necessary for clearly describing the exemplary embodiments are omitted, and the same reference numerals represent the same elements throughout the disclosure.

It will be understood that when an element or layer is referred to as being connected to another element or layer, the element or layer can be 'directly connected' to another element or layer or can be 'electrically connected' to another element or layer via another element or layer interposed therebetween. Also, it will be understood that when an element or layer 'includes' another element or layer, the element or layer may further other elements or layers unless specified otherwise.

FIG. 1 is a diagram which illustrates a list of content to be shared, which is set by an electronic device 100, according to an exemplary embodiment.

According to an exemplary embodiment, the electronic device 100 may set contents to be shared according to a network formed using access point (AP) to which the electronic device 100 is connected. For example, in response to the electronic device 100 being connected to a first AP 120, the electronic device 100 may share all of contents stored therein, based on a list 110 of contents to be shared, which is stored to match the first AP 120. In response to the electronic device 100 being connected to a second AP 130, the electronic device 100 may share a first content to a third content stored therein, based on the list 110 of contents to be shared, which is stored to match the second AP 130. In response to the electronic device 100 being connected to a third AP 140, the electronic device 100 may share a first content and a second content stored therein, based on the list 110 of contents to be shared, which is stored to match the third AP 140.

Figure 6:
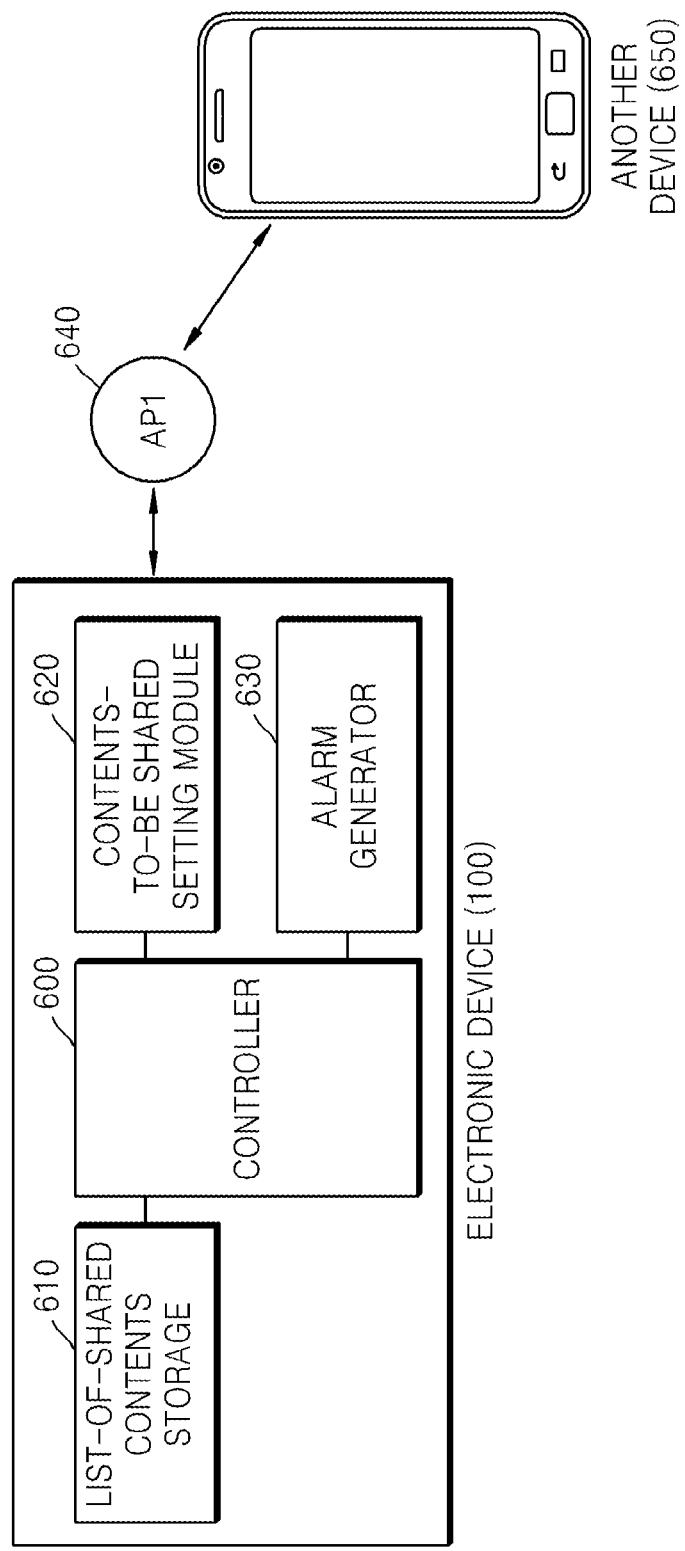
FIG. 6 is a schematic block diagram of an electronic device according to an exemplary embodiment.

According to an exemplary embodiment, the list 110 of contents to be shared may include a list obtained by storing contents shared between the electronic device 110 and another device 650 of FIG. 6, via an AP, such that the contents match the AP.

According to an exemplary embodiment, the network formed using the AP may mean a network via in which the AP and devices directly connected to the AP are also connected to one another. For example, the network formed using the AP may be a home network connecting a television (TV), a personal computer (PC), a mobile phone, a digital camera, etc., that are connected to one AP.

According to another exemplary embodiment, the network formed using the AP may include a network connecting devices which are connected to an electronic device via the AP.

According to an exemplary embodiment, the network formed using the AP may be replaced with a network through which devices are directly connected to one another without the AP. For example, the network formed using the AP may be replaced with a connection between devices using Bluetooth®, a wireless ad hoc network, or the like.

Figure 2:
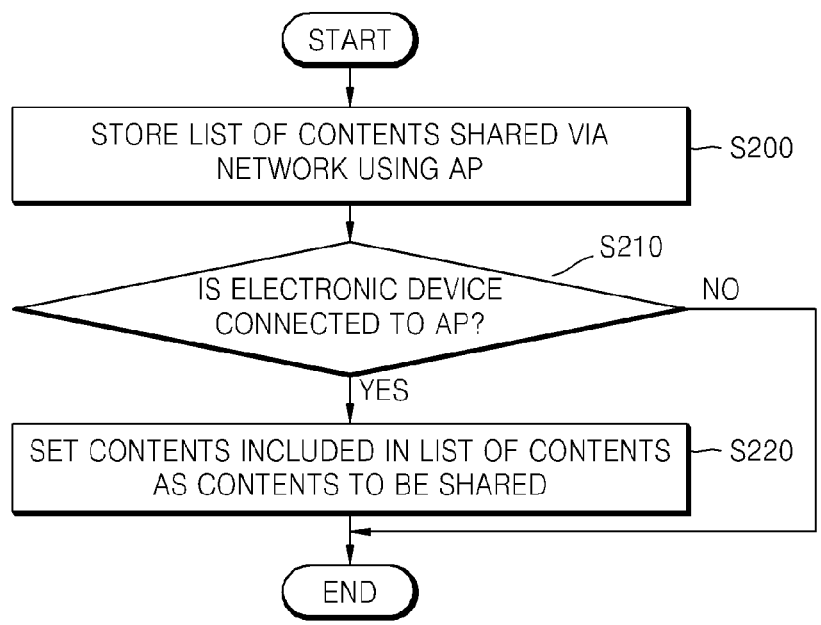
FIG. 2 is a flowchart which illustrates a process of setting contents to be shared according to an exemplary embodiment.

FIG. 2 is a flowchart illustrating a process of setting contents to be shared according to an exemplary embodiment.

Referring to FIGS. 1 and 2, first, the electronic device 100 may store a list of contents shared between the electronic device 100 and another device 650 of FIG. 6, such that the contents may match an AP, via a network formed by the electronic device 100 via the AP (operation S200).

Here, according to an exemplary embodiment, the list of contents shared between the electronic device 100 and the other device 650 via the network formed using the AP may be stored in the form of a table storing identification (ID) information of the AP and ID information of the shared contents. The ID information of the AP may include information identifying the AP, such as a service set identifier (SSID) of the AP or a MAC address of a device that constitutes the AP. The ID information of the contents may include information identifying the contents, such as location information of the contents or links for accessing the contents.

According to an exemplary embodiment, the electronic device 100 may store the list of contents shared with the other device 650 to further include information regarding times when the contents are shared.

According to another exemplary embodiment, the electronic device 100 may store the list of contents shared with the other device 650 in order to further include ID information related to the external device 650. Here, the ID information of the external device 650 may include information identifying the other device 650, such as a MAC address of or an internet protocol (IP) address of the other device 650.

Also, according to an exemplary embodiment, the electronic device 100 may store the list of contents shared with the other device 650 in either a storage medium included in the electronic device 100 or included in a separate server. Here, the storage medium included in the electronic device 100 may be a memory included in the electronic device 100.

Also, according to an exemplary embodiment, the contents shared between the electronic device 100 and the other device 650 via the network formed using the AP may include contents transmitted to the other device 650, via the AP. For example, the contents shared between the electronic device 100 and the external device 650 may include a moving picture transmitted from a mobile phone to a TV connected to the AP, via the AP.

The contents shared between the electronic device 100 and the other device 650 via the network formed using the AP may further include a content transmitted using an application, such as a share program or a backup program installed in the electronic device 100. Also, the contents shared between the electronic device 100 and the other device 650 via the network formed using the AP may include a content transmitted to a cloud server. The cloud server may be a server configured to provide a cloud service enabling the electronic device 100 to share contents with the other device 650.

In response to the electronic device 100 being connected to the AP (operation S210), the electronic device 100 may set contents included in the list of contents stored to match the AP, as contents to be shared (operation S220).

In this case, according to an exemplary embodiment, the electronic device 100 may also set a content that shares as a content to be shared at least one piece of meta data with the contents included in the list of contents stored to match the AP. For example, when the list of contents stored to match the AP connected to the electronic device 100 includes "drama episode 1," the electronic device 100 may also set as contents to be shared "drama episode 2" and "drama episode 3" that share meta data with the 'drama episode 1."

According to an exemplary embodiment, the electronic device 100 may set contents to be shared, based on times when contents are shared via the AP and a current time. For example, if among contents shared via the AP, "photo 1" and "photo 2" are shared at 11:00 to 12:00 a.m. and "moving picture 1" and "document 1" are shared at 22:00 to 23:00 p.m., and current time is 11:00 to 12:00 a.m., then the electronic device 100 may set "photo 1" and "photo 2" as contents to be shared.

According to another exemplary embodiment, the other device 650, the information of which is stored to match contents shared via the AP and a device connected to the network formed using the AP are the same, the electronic device 100 may set, as contents to be shared, contents included in the list of contents shared with the other device 650. For example, in response to the electronic device 100 sharing a moving picture with a TV via the AP, the moving picture is included in the list of contents stored to match the AP, and the electronic device 100 is connected to the AP, then the electronic device 100 may determine whether the TV is connected to the network formed using the AP to which the electronic device 100 is connected. In response to a determination that the TV is connected to the formed network, the electronic device 100 may set the moving picture as a content to be shared.

According to another exemplary embodiment, the electronic device 100 may set contents to be shared, in units of types of contents. For example, when a content consisting of moving pictures is included in the list of contents stored to match the AP, a content consisting of moving pictures stored in the electronic device 100 may be set as a content to be shared.

Also, according to an exemplary embodiment, in response to the list 110 of contents to be shared being stored in a server, the electronic device 100 may receive the list 110 of contents to be shared, which is stored to match the AP, from the server, and set contents included in the list 110 of contents to be shared, as contents to be shared, when the electronic device 100 is connected to the AP.

FIG. 3 is a flowchart which illustrates a process of setting contents to be shared according to another exemplary embodiment.

Referring to FIGS. 1 and 3, first, the electronic device 100 may store a list of contents shared between the electronic device 100 and the other device 650 of FIG. 6, via a network formed using an AP, such that the contents match the AP (operation S300).

In response to the electronic device 100 being connected to the network formed using the AP (operation S310), the electronic device 100 may determine whether it is connected to the network including a plurality of APs (operation S320).

In response to a determination in operation S320 that the electronic device 100 is connected to the network including the plurality of APs, the electronic device 10 may output an alarm which indicates the connection to the network including the plurality of APs (operation S330).

According to an exemplary embodiment, the electronic device 100 may output an alarm which indicates the connection to the network by displaying to a screen thereof a list of the plurality of APs to which the electronic device 100 is connected. The electronic device 100 may then select an AP from the list of the plurality of APs output according to a user input, and may set as contents to be shared (operation S340) contents included in a list of contents matching the selected AP.

In response to a determination in operation S320 that the electronic device is not connected to the network including the plurality of APs, the electronic device 100 may set as contents to be shared (operation S340) contents included in the list of contents to be shared, which matches the AP to which the electronic device 100 is connected.

Thereafter, the electronic device 100 may cancel the setting of the contents as the contents to be shared so that the contents cannot be shared (operation S350).

According to an exemplary embodiment, the electronic device 100 may check a received signal strength indication (RSSI) of the AP to which the electronic device 100 is connected. When the RSSI is less than or equal to a predetermined value, the electronic device 100 may cancel the setting of the contents as the contents to be shared.

FIG. 4 is a table which illustrates a method of storing a list of contents shared between an electronic device and another device, according to an exemplary embodiment.

Referring to FIGS. 1 and 4, the electronic device 100 may store ID information related to an AP to which the electronic device 100 is connected when contents are shared, information regarding times when the contents are shared, and contents shared with the other device 650 of FIG. 6, such that they match one another.

FIG. 5 is a table which illustrates a method of storing a list of contents shared between an electronic device and another device, according to another exemplary embodiment.

Referring to FIGS. 1 and 5, the electronic device 100 may store ID information related to APs to which the electronic device 100 is connected when contents are shared, information regarding times when the contents are shared, and contents shared with the other device 650 of FIG. 6, such that the contents match one another.

FIG. 6 is a schematic block diagram of an electronic device 100, according to an exemplary embodiment.

According to an exemplary embodiment, the electronic device 100 capable of sharing contents with another device may provide a storage 610 that includes a list-of-shared contents and stores a list of contents shared, via a network formed using an AP, between the electronic device 100 and the other device 650, such that the contents match the AP; a contents-to-be shared setting module 620 that sets contents included in the list of contents stored to match the AP, as contents to be shared when the electronic device 100 is connected to the network via the AP; and a controller 600 that is configured to control the list-of-shared contents storage 610 and the contents-to-be shared setting module 620.

According to an exemplary embodiment, the list-of-shared contents storage 610 may store the list of contents shared between the electronic device 100 and the other device 650 via the network formed using the AP, such that the contents match the AP.

According to an exemplary embodiment, the list of contents shared between the electronic device 100 and the other device 650 via the network formed using the AP may be stored in the form of a table storing ID information related to the AP and ID information related to the shared contents. The ID information of the AP may include information identifying the AP, such as an SSID of the AP or a MAC address of a device constituting the AP. The ID information of the contents may include information identifying the contents, such as location information of the contents or links for accessing the contents.

According to an exemplary embodiment, the list-of-shared contents storage 610 may store the list of contents shared to further include information regarding times when the contents are shared.

According to another exemplary embodiment, the list-of-shared contents storing storage 610 may store the list of shared contents and to further include ID information of the other device 650 that shares the contents. The ID information of the other device 650 may include information identifying the other device 650, such as a MAC address or IP address of the other device 650.

According to an exemplary embodiment, the list of contents shared may be stored in either a storage medium included in the electronic device 100 or at a separate server.

According to an exemplary embodiment, the contents shared between the electronic device 100 and the other device 650 via the network formed using the AP may include a content transmitted to the other device 650 via the AP. For example, the shared contents may include a moving picture transmitted via the AP from a mobile phone to a TV connected to an AP.

The contents shared between the electronic device 100 and the other device 650 via the network formed using the AP may further include a content transmitted using an application, e.g., a share program or a backup program installed in the electronic device 100. The contents shared with the other device 650 may further include a content transmitted to a cloud server. The cloud server may be a server configured to provide a cloud service enabling the electronic device 100 to share contents with the other device 650.

According to an exemplary embodiment, the contents-to-be shared setting module 620 may set the contents included in the list of contents stored to match the AP to which the electronic device 100 is connected, as contents to be shared.

The contents-to-be shared setting module 620 may also set a content that shares at least one piece of meta data with the contents included in the list of contents shared, as a content to be shared.

The contents-to-be shared setting module 620 may set contents to be shared, based on times when the contents are shared via the AP and the current time.

The contents-to-be shared setting module 620 may set the contents included in the list of contents shared with the other device 650, as contents to be shared, in response to the external device 650, the information of which being stored to match the contents shared via the AP and a device connected to the network formed using the AP, being the same.

The contents-to-be shared setting module 620 may set contents to be shared, in units of types of contents.

In response to the list of contents shared being stored in a server, the contents-to-be shared setting module 620 may receive from the server the list of shared contents stored to match the AP, in response to the electronic device 100 being connected to the AP, and may set contents included in the received list of shared contents as contents to be shared.

According to an exemplary embodiment, the contents-to-be shared setting module 620 may check an RSSI of the AP to which the electronic device 100 is connected, and may cancel the setting of the contents as the contents to be shared in response to the RSSI being less than or equal to a predetermined value.

The electronic device 100 may further include an alarm generator 630 configured to generate an alarm in response to the electronic device 100 being connected to a plurality of APs.

The alarm generator 630 may output an alarm which indicates that the electronic device 100 is connected to a network including APs by displaying on a screen of the electronic device 100 the list of the APs to which the electronic device 100 is connected. In this case, when one AP is selected from the list of APs output according to a user input, the contents-to-be shared setting device 620 may set contents included in a list of contents matching the selected AP, as contents to be shared.

Figure 7:
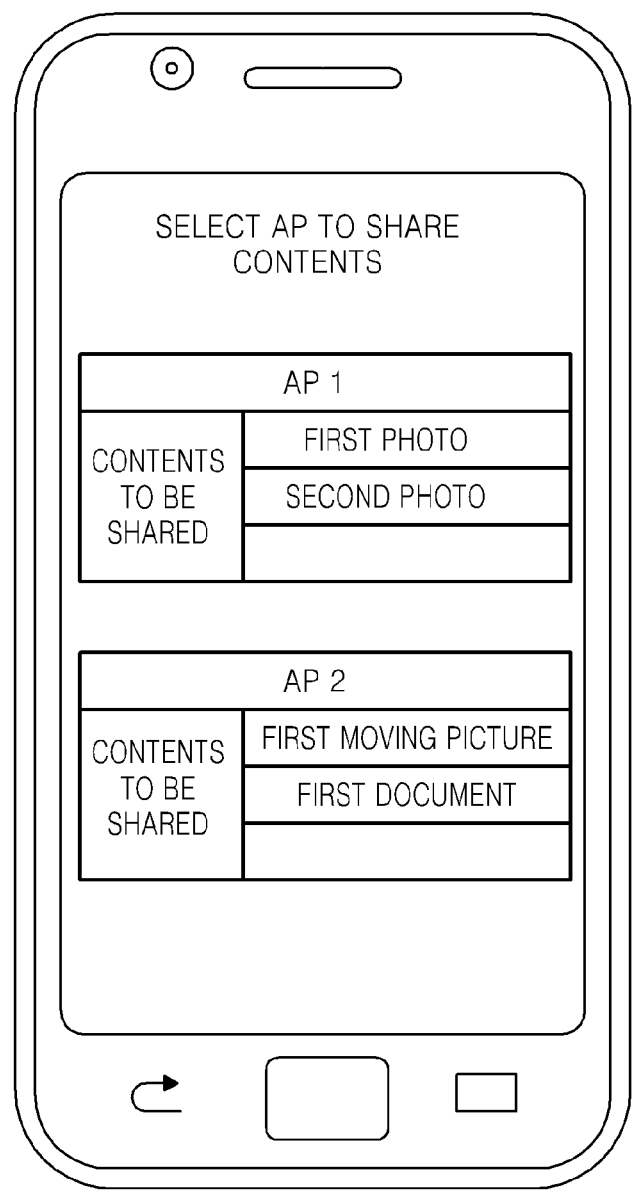
FIG. 7 is a diagram which illustrates an image displayed on an electronic device in response to the electronic device being connected to a plurality of access points (APs) according to an exemplary embodiment.

FIG. 7 is a diagram which illustrates an image displayed on an electronic device 100 in response to the electronic device 199 being connected to a plurality of APs according to an exemplary embodiment.

In response to the electronic device 100 being connected to the plurality of APs, the electronic device 100 may display information regarding the plurality of APs on a screen thereof, as illustrated in FIG. 7. The electronic device 100 may further display lists of contents to be shared, which are respectively stored to match the plurality of APs.

According to an exemplary embodiment, the electronic device 100 may select one of the plurality of APs displayed on the screen, and may set contents included in the list of contents to be shared, which is stored to match the selected AP, as contents to be shared.

An exemplary embodiment of the present invention may be embodied as a computer readable recording medium that stores a command that may be executed using a computer, such as a program module run by a computer. Examples of the computer readable recording medium may include an arbitrary storage medium that may be accessed by a computer, a volatile/nonvolatile medium, a detachable/non-detachable medium, etc. Examples of the computer readable recording medium may further include a non-transitory computer readable storage medium and a communication medium. The non-transitory computer readable storage medium may be a volatile/non-volatile medium or a detachable/non-detachable medium embodied according to an arbitrary method or technology so as to store information, such as a computer readable command, a data structure, a program module, or other data. In general, the communication medium may be a computer readable command, a data structure, a program module, or other data such as a modulated data signal, or an arbitrary information transmission medium.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. For example, elements described as single types may be embodied as being separated from one another. Similarly, elements described as being separated from one another may be embodied in a combined manner.

What is claimed is:

1. A method of sharing content for an electronic device, including at least one processor, the method comprising:

storing, using at least one of said at least one processor, a first list of at least one content shared between the electronic device and another device via a network formed using a first access point and a second list of at least one content shared between the electronic device and another device via a network formed using a second access point;

detecting signals transmitted from a plurality of access points comprising the first access point and the second access point;

connecting to a network via a single access point of the plurality of access points; and setting, using at least one of said at least one processor, the at least one content included in the first list, as contents to be shared, in response to the electronic device being connected to the first access point or setting the at least one content included in the second list, as content to be shared, in response to the electronic device being connected to the second access point, wherein in response to the single access point being selected among the plurality of access points, the setting corresponding to the selected single access point is initiated, wherein the setting further comprises setting, as content to be shared, content that is not included in the first list but shares at least one piece of meta data with the contents included in the first list in response to the electronic device being connected to the first access point.

2. The method of claim 1, wherein the setting further comprises setting, as content to be shared, content that is not included in the second list but shares at least one piece of meta data with the contents included in the second list, in response to the electronic device being connected to the second access point.

3. The method of claim 1, further comprising:

checking, using at least one of said at least one processor, a received signal strength indication (RSSI) of the first access point, in response to the electronic device being connected to the first access point, and second access point, in response to the electronic device being connected to the second access point; and canceling, using at least one of said at least one processor, the setting when the RSSI is less than or equal to a predetermined value.

4. The method of claim 1, further comprising:

determining, using at least one of said at least one processor, whether the electronic device is connected to the network which includes the first access point and the second access point; and outputting, using at least one of said at least one processor, an alarm which indicates the connection to the network including the first access point and the second access point.

5. The method of claim 4, wherein the outputting of the alarm comprises displaying the first access point and the second access point in a list.

6. The method of claim 1, wherein the setting further comprises setting the at least one content as the contents to be shared, based on times, to authorize the at least one content on the first list to be shared using the first access point when the electronic device is connected to the first access point at the times.

7. The method of claim 1, wherein the storing further comprises storing the at least one content in the first list and the at least one content in the second list in association with the other device that shares the contents with the electronic device, and the setting further comprises setting contents associated with the other device, as the contents to be shared, in response to a device being connected to a network formed using an access point to which the other device is connected.

8. The method of claim 1, wherein the setting further comprises setting the contents to be shared in units of types of content.

9. The method of claim 1, wherein the storing further comprises storing the first list and the second list in a separate server, and the setting further comprises:
receiving, using at least one of said at least one processor, from the server the first list, in response to the electronic device being connected to the first access point and the second list, in response to the electronic device being connected to the second access point; and
setting, using at least one of said at least one processor, contents included in the received list as the contents to be shared.

10. The method of claim 1, wherein the at least one content in the first list, in response to the electronic device being connected to the first access point, and the at least one content in the second list, in response to the electronic device being connected to the first access point, comprise at least one content transmitted from the electronic device to a cloud server, via the first access point, in response to the electronic device being connected to the first access point, and the second access point, in response to the electronic device being connected to the second access point.

11. An electronic device, including at least one processor, capable of sharing contents with another device, the electronic device comprising:

a storage configured to store a first list of at least one content shared between the electronic device and another device via a network formed using a first access point and a second list of at least one content shared between the electronic device and another device via a network formed using a second access point; and a processor configured to set the at least one content included in the first list, as contents to be shared, in response to the electronic device being connected to the first access point or setting the at least one content included in the second list, as content to be shared, in response to the electronic device being connected to the second access point, wherein the electronic device is connected to a single access point of a plurality of access points comprising the first access point and the second access point in response to detecting signals transmitted from the plurality of access points, and wherein in response to the single access point being selected among the plurality of access points, the setting corresponding to the selected single access point is initiated, wherein the processor is further configured to set, as content to be shared, content that is not included in the first list but shares at least one piece of meta data with the contents included in the first list in response to the electronic device being connected to the first access point.

12. The electronic device of claim 11, wherein the processor is further configured to set, as content to be shared, content that is not included in the second list but shares at least one piece of meta data with the contents included in the second list, in response to the electronic device being connected to the second access point.

13. The electronic device of claim 11, wherein the processor is further configured to check a received signal strength indication (RSSI) of the first access point, in response to the electronic device being connected to the first access point, and second access point, in response to the electronic device being connected to the second access point, and cancel the setting in response to the RSSI being less than or equal to a predetermined value.

14. The electronic device of claim 11, wherein the processor is further configured to output an alarm which indicates that the electronic device is connected to a network including the first access point and the second access point in response to a determination that the electronic device is connected to the network including the first access point and the second access point.

15. The electronic device of claim 14, wherein the processor outputs to a screen of the electronic device the first access point and the second access point in a list.

16. The electronic device of claim 11, wherein the processor is further configured to set the at least one content as the contents to be shared, based on times, to authorize the at least one content on the first list to be shared using the first access point when the electronic device is connected to the first access point at the times.

17. The electronic device of claim 11, wherein the storage is further configured to store the at least one content in the first list and the at least one content in the second list in association with the other device that shares the contents with the electronic device, and the processor is further configured to set contents associated with the other device, as the contents to be shared, in response to a device being connected to a network formed using an access point to which the other device is connected.

18. The electronic device of claim 11, wherein the processor is further configured to set the contents to be shared in units of types of content.

19. The electronic device of claim 11, wherein the storage is further configured to store the first list and the second list in a separate server, and the processor is further configured to receive the first list, in response to the electronic device being connected to the first access point and the second list, in response to the electronic device being connected to the second access point, and set contents included in the received list as the contents to be shared.

20. The electronic device of claim 11, wherein the at least one content in the first list, in response to the electronic device being connected to the first access point, and the at least one content in the second list, in response to the electronic device being connected to the first access point, comprise at least one content transmitted from the electronic device to a cloud server, via the first access point, in response to the electronic device being connected to the first access point, and the second access point, in response to the electronic device being connected to the second access point.

21. A non-transitory computer readable storage medium having recorded thereon a program, wherein the program, when executed by a processor of a computer, causes the computer to:

store, using at least one of said at least one processor, first list of at least one content shared between the electronic device and another device via a network formed using a first access point and a second list of at least one content shared between the electronic device and another device via a network formed using a second access point;

detect signals transmitted from a plurality of access points comprising the first access point and the second access point;

connect, using at least one of said at least one processor, to a network via a single access point of the plurality of access points;

set, using at least one of said at least one processor, the at least one content included in the first list, as contents to be shared, in response to the electronic device being connected to the first access point or setting the at least one content included in the second list, as content to be shared, in response to the electronic device being connected to the second access point; and set as content to be shared, content that is not included in the first list but shares at least one piece of meta data with the contents included in the first list in response to the electronic device being connected to the first access point, wherein in response to the single access point being selected among the plurality of access points, the setting corresponding to the selected single access point is initiated.

* * * * *